United States Patent Office 2,977,393
Patented Mar. 28, 1961

2,977,393

PROCESS OF PRODUCING DIVINYL ETHERS OF POLYHYDRIC ALCOHOLS

Ernst Walling, Rheinberg, and Gerhard Faerber, Moers, Germany, assignors to Deutsche Solvay-Werke G.m. b.H., Solingen-Ohligs, Germany No Drawing. Filed June 2, 1954, Ser. No. 434,084

Claims priority, application Germany July 14, 1953

6 Claims. (Cl. 260—615)

The present invention relates to a new and highly advantageous method of producing divinyl ethers of polyhydric alcohols and more particularly to the production of such divinyl ethers in high yield by means of a new reaction.

Attempts to produce divinyl ethers by known methods comprising the reaction of acetylene and ethylene glycol only resulted in the production of a mixture containing a considerable amount of mono-ether. By increasing the reaction time or raising the temperature the result was not an increase in the formation of divinyl ether but rather only an increase in the formation of the relatively valueless ethyleneethylidene acetals. The difficulties in the production of divinyl ethers of polyhydric alcohols occurred particularly in the case of polyhydric alcohols wherein the hydroxyl groups were in 1,2- or 1,3-position.

It is therefore a primary object of the present invention to provide a process of producing divinyl ethers of polyhydric alcohols by means of a new reaction.

It is another object of the present invention to provide a process of producing divinyl ethers of polyhydric alcohols having the hydroxyl groups in 1,2- or in 1,3-position without danger of formation of a large proportion of cyclic acetals.

It is still another object of the present invention to provide a process of producing divinyl ethers in practically quantitative yield.

Other objects and advantages of the present invention will be apparent from a further reading of the specification and of the appended claims.

With the above objects in view the present invention mainly comprises a process of producing divinyl ethers of polyhydric alcohols, comprising the steps of reacting the monovinyl ether of a polyhydric alcohol with acetylene, thereby forming the divinyl ether of the polyhydric alcohol; and recovering said divinyl ether.

The reaction is generally carried out at a raised temperature and in the presence of an alkaline catalyst which is adapted to promote the reaction. Any common vinylation catalyst may be employed for this purpose. Such vinylation catalysts are in general the alkali metal hydroxides such as potassium hydroxide and sodium hydroxide and the alkali metal alcoholates. Particularly good results are obtained utilizing potassium hydroxide or potassium alcoholate as the catalyst. The catalyst is preferably dissolved in the monovinyl ether.

The reaction is further preferably carried out at a temperature between about 110–170° C. and most preferably at a temperature between 115–135° C., and under pressure. The most suitable pressure for the reaction has been found to be between 5–30 atmospheres. This pressure may be supplied by means of the acetylene gas itself, or by acetylene gas mixed with an inert gas. In this connection the inert gas is meant to denote those gases which are inert to reaction with the monovinyl ether, the acetylene and the divinyl ether at the reaction temperature. Of course the rare gases such as neon and argon may be utilized for this purpose, but since excellent results are obtainable with the inexpensive gas nitrogen, this is of course the most preferred inert gas for the purposes of the present invention.

The monovinyl ethers which are reactive with the acetylene according to the present invention may be produced by any method. According to a preferred embodiment of the present invention the monovinyl ethers are produced by the method disclosed in our copending United States patent application Serial No. 416,672, filed March 16, 1954, for "Production of Monovinyl Ethers of Polyhydric Alcohols." It is a preferred embodiment of the present invention that monovinyl ethers produced by the method disclosed in our copending application are isolated from the reaction mass and are, in pure form or in the form of a highly concentrated azeotropic mixture of the monovinyl ether and the starting alcohol, treated with acetylene to produce the corresponding divinyl ether.

The production of the divinyl ether from the monovinyl ether can be carried out continuously or discontinuously.

Although the process of the present invention has particular application to the production of divinyl ethers of polyhydric alcohols having the hydroxyl groups in 1,2- and 1,3-positions, since the production of divinyl ethers in high yields from such polyhydric alcohols has been the most difficult, the invention may be equally utilized in the production of divinyl ethers of polyhydric alcohols wherein the hydroxyl groups are in 1,4-position or another position.

The process of the present invention is particularly suited to the production of divinyl ethers in practically quantitative yield of dihydric alcohols such as ethylene glycol, propylene glycol, trimethylene glycol, 1,3-butylene glycol and the like dihydric alcohols, and the reaction is also applicable to the production of divinyl ethers of other polyhydric alcohols such as glycerine, by reacting the monovinyl ether of the polyhydric alcohol with acetylene. The production of divinyl ethers in practically quantitative yield by means of this reaction is completely unexpected particularly since practically no cyclic acetals are formed.

The following examples are given as illustrative of the process of the present invention, the scope of the invention not however being limited to the specific details of the examples.

Example 1

200 parts by weight of a 3.5% solution of potassium hydroxide in ethylene glycol monovinyl ether are heated in a pressure vessel under 3 atmospheres of nitrogen pressure to a temperature of 120° C. While agitating the liquid, acetylene is introduced into the vessel at a pressure up to 20 atmospheres and the loss of pressure during the reaction is equalized by continuously adding fresh acetylene.

After 24 hours, the contents of the pressure vessel has increased by 40 parts by weight. The divinyl ether is subsequently separated from non-converted monovinyl ether and from any cyclic acetal. The yield of ethylene glycol divinyl ether is above 85% calculated on the starting ethylene glycol monovinyl ether.

Example 2

The azeotropic mixture obtained according to Example 4 of our copending application Serial No. 416,672 and consisting mainly of trimethylene glycol monovinyl ether and containing a small amount of non-converted trimethylene glycol is fractionated and the portion boiling at 69° C. under pressure of 13 mm. Hg is utilized. 100 parts by weight of a solution of 2.9% KOH in this trimethylene glycol monovinyl ether is heated to 126° C. in a pressure vessel and is treated as in Example 1 with a mixture of nitrogen and acetylene.

After 24 hours trimethylene glycol divinyl ether having a boiling point of 85° C. at a pressure of 77 mm. Hg is formed in a yield of 80% of the introduced monovinyl ether. Less than 5% of cyclic acetal is formed. The remainder of the liquid consists of non-converted trimethylene glycol monovinyl ether which may be practically all converted into trimethylene glycol divinyl ether by further application of acetylene.

While the invention has been illustrated and described as embodied in a process of producing divinyl ethers of polyhydric alcohols, it is not intended to be limited to the details shown, since various modifications and structural changes may be made without departing in any way from the spirit of the present invention.

Without furthehr analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing divinyl ethers of dihydric alcohols, comprising the steps of treating the monovinyl ether of an acyclic saturated dihydric alcohol having a free hydroxyl group with acetylene at a temperature of 110–170° C., said temperature being adapted to cause reaction between said monovinyl ether having a free hydroxyl group and said acetylene and in the presence of an alkaline catalyst adapted to promote said reaction, thereby forming the divinyl ether of said dihydric alcohol; and recovering said divinyl ether.

2. A process of producing divinyl ethers of dihydric alcohols, comprising the steps of treating the monovinyl ether of an acyclic saturated dihydric alcohol having a free hydroxyl group with acetylene at a temperature of 115–135° C., said temperature being adapted to cause reaction between said monovinyl ether having a free hydroxyl group and said acetylene and in the presence of alkali hydroxide as catalyst adapted to promote said reaction, thereby forming the divinyl ether of said dihydric alcohol; and recovering said divinyl ether.

3. A process of producing divinyl ethers of dihydric alcohols, comprising the steps of treating the monovinyl ether of an acyclic saturated dihydric alcohol having a free hydroxyl group with acetylene in the presence of an alkaline catalyst adapted to promote said reaction at a temperature of about 110–170° C. and under a pressure of 5–30 atmospheres so as to cause reaction between said monovinyl ether having a free hydroxyl group and said acetylene, thereby forming the divinyl ether of said dihydric alcohol; and recovering said divinyl ether.

4. A process of producing divinyl ethers of dihydric alcohols, comprising the steps of treating the monovinyl ether having a free hydroxyl group of an acyclic saturated dihydric alcohol selected from the group consisting of dihydric alcohols having the hydroxyl groups in 1,2-position and dihydric alcohols having the hydroxyl groups in 1,3-position with acetylene in the presence of an alkaline catalyst at a temperature of about 115–135° C. and under a pressure of 5–30 atmospheres so as to cause reaction between said monovinyl ether having a free hydroxyl group and said acetylene, thereby forming the divinyl ether of said dihydric alcohol; and recovering said divinyl ether.

5. A process of producing divinyl ethers of dihydric alcohols, comprising the steps of treating the monovinyl ether of an acyclic saturated dihydric alcohol having a free hydroxyl group with acetylene at a temperature of about 115–135° C. and under a pressure of 5–30 atmospheres so as to cause reaction between said monovinyl ether having a free hydroxyl group and said acetylene, thereby forming the divinyl ether of said dihydric alcohol; and recovering said divinyl ether.

6. A process of producing divinyl ethers of dihydric alcohols, comprising the steps of heating acetylene and an acyclic saturated dihydric alcohol in the presence of an alkali catalyst at a temperature below the boiling point of said dihydric alcohol so as to cause reaction between said acetylene and said uolyhydric alcohol to form a monovinyl ether having a free hydroxyl group, said temperature being above the boiling point of the thus formed monovinyl ether, thereby forming a reaction mass comprising liquid polyhydric alcohol and monovinyl ether vapors; removing said monovinyl ether vapors as the same are formed, thereby preventing side reactions and obtaining substantially pure monovinyl ether having a free hydroxyl group of said dihydric alcohol; treating said monovinyl ether having a free hydroxyl group with acetylene in the presence of an alkaline catalyst at a temperature of about 110–170° C. and under a pressure of 5–30 atmospheres so as to cause reaction between said monovinyl ether having a free hydroxyl group and said acetylene, thereby forming the divinyl ether of said dihydric alcohol; and recovering said divinyl ether.

References Cited in the file of this patent
UNITED STATES PATENTS

| | | |
|---|---|---|
| 1,712,830 | Kyrides | May 14, 1929 |
| 1,796,690 | Herrmann et al. | Mar. 17, 1931 |
| 1,959,927 | Reppe | May 22, 1934 |

OTHER REFERENCES

Advances in Acetylene Chemistry As Developed by Walter Reppe, Intelligence Division Report No. 4149, pub. Jan. 25, 1946, page 3 (1 page only).